Figure 1:
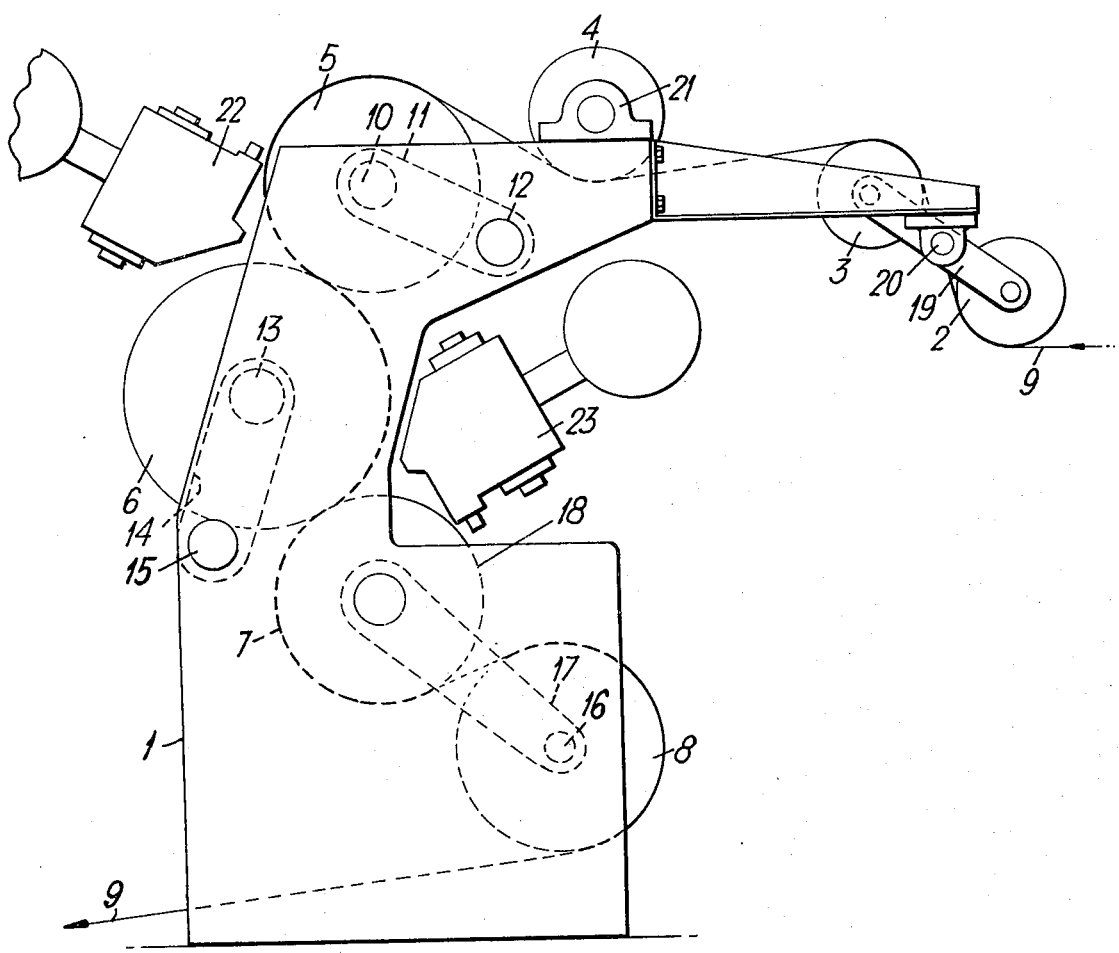

United States Patent [19]

Stark et al.

[11] 3,899,112
[45] Aug. 12, 1975

[54] APPARATUS FOR TREATING WEBS OF MATERIAL

[75] Inventors: Sven Olof Soren Stark, Sodra Sandby; Per Allan Ljungberg, Lund, both of Sweden

[73] Assignee: Tetra Pak Developpement S.A., Lausanne, Switzerland

[22] Filed: Oct. 27, 1972

[21] Appl. No.: 301,320

[30] Foreign Application Priority Data
Dec. 22, 1971 United Kingdom............... 59641/71

[52] U.S. Cl. ..................... 226/90; 226/91; 226/113; 226/114; 226/189
[51] Int. Cl.² .......................................... B65H 17/20
[58] Field of Search ............ 226/90, 118, 119, 189, 226/91, 113, 114

[56] References Cited
UNITED STATES PATENTS

| | | | |
|---|---|---|---|
| 1,140,460 | 5/1915 | Jaeger............................ | 226/195 X |
| 2,204,600 | 6/1940 | Kabela............................ | 226/195 X |
| 3,119,300 | 1/1964 | Barocela........................... | 226/90 X |
| 3,223,344 | 12/1965 | Weymouth........................ | 226/90 X |
| 3,246,818 | 4/1966 | Davis ................................ | 226/90 |
| 3,433,398 | 3/1969 | Fadden ........................... | 226/195 X |
| 3,543,982 | 12/1970 | Sargent.............................. | 226/90 |
| 3,630,426 | 12/1971 | Rieger............................. | 226/195 X |
| 3,669,331 | 6/1972 | Renold............................. | 226/187 X |

Primary Examiner—Richard A. Schacher
Attorney, Agent, or Firm—Young & Thompson

[57] ABSTRACT

Apparatus for coating a web of material such as paper, with a fluent plastics coating material, comprising a plurality of working rollers about and between which the web moves. Certain of the rollers are relatively movable to space them apart for web insertion and gripping. Coating devices apply fluent plastics material to both faces of the web.

8 Claims, 3 Drawing Figures

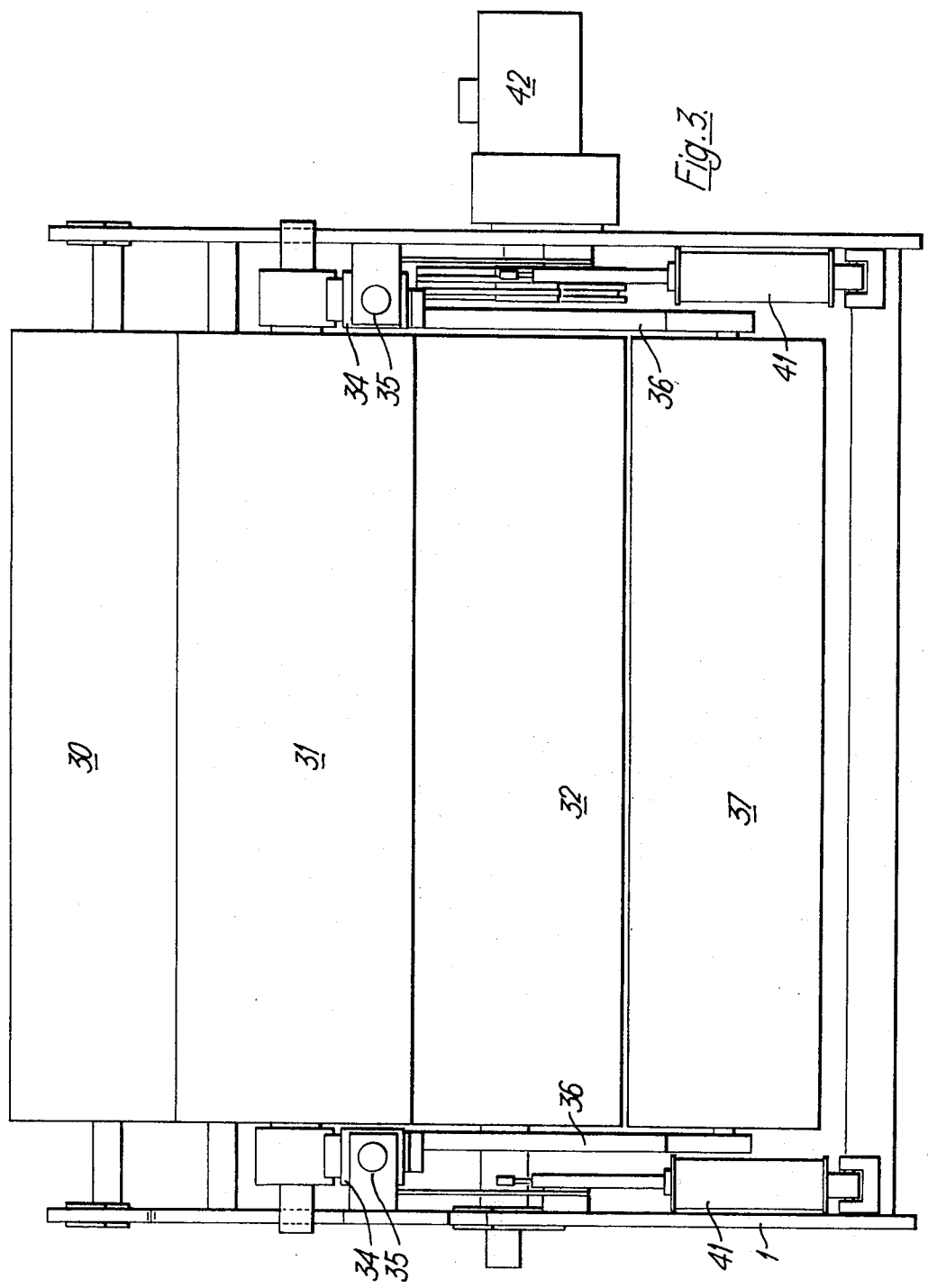

APPARATUS FOR TREATING WEBS OF MATERIAL

This invention relates to apparatus for treating webs of material, and more especially to machines in which a web of material runs over a series of rollers, passing in serpentine manner between successive rollers, in the course of treatment.

A typical machine to which the invention is applicable is used in preparing packaging material for the manufacture of packages.

In such a machine a web of backing material, e.g., of paper or laminate, runs over and between rollers in order to be coated on one face with a plastics layer, e.g., of polythene. In such a machine the web may run between first and second rollers while its face is being coated, and subsequently between or over other rollers: and in addition it may run over guide rollers while being fed into and withdrawn from the machine. The working rollers are already closely spaced or in contact and some difficulty arises in threading a web into the machine in order to set up the machine for operation. The main object of the invention is to provide a machine in which this difficulty is reduced or eliminated.

With this end in view the invention consists in apparatus for treating a web of material by passing the web in serpentine manner between working rollers, wherein some at least of the rollers are movable to separate them from neighbouring rollers and to leave between the separated rollers a comparatively free open path through which the leading end of the web may be readily passed, whereafter the separated rollers can be brought together to grip the web between them.

After the web has thus been inserted the rollers are moved together in order to carry out their normal function on the web. Guide rollers on the in-put and/or outgoing sides of the machine may be similarly movable to open up the path along which the web may be passed when the machine is being prepared for operation. In one convenient form of machine in accordance with the invention a roller or rollers may rotate on a shaft or shafts mounted between the ends of pivoted lever supports, allowing such a shaft to be swung away from, and back towards its neighbour. In another convenient form of machine in accordance with the invention a roller or rollers may run on a shaft or shafts mounted in a slidable frame so that the rollers can be moved apart and brought together.

According to another feature of the invention a machine may be arranged to treat both faces of a web of material e.g., by coating with plastics, in a single operation of passing the web through the machine.

Figure 2:
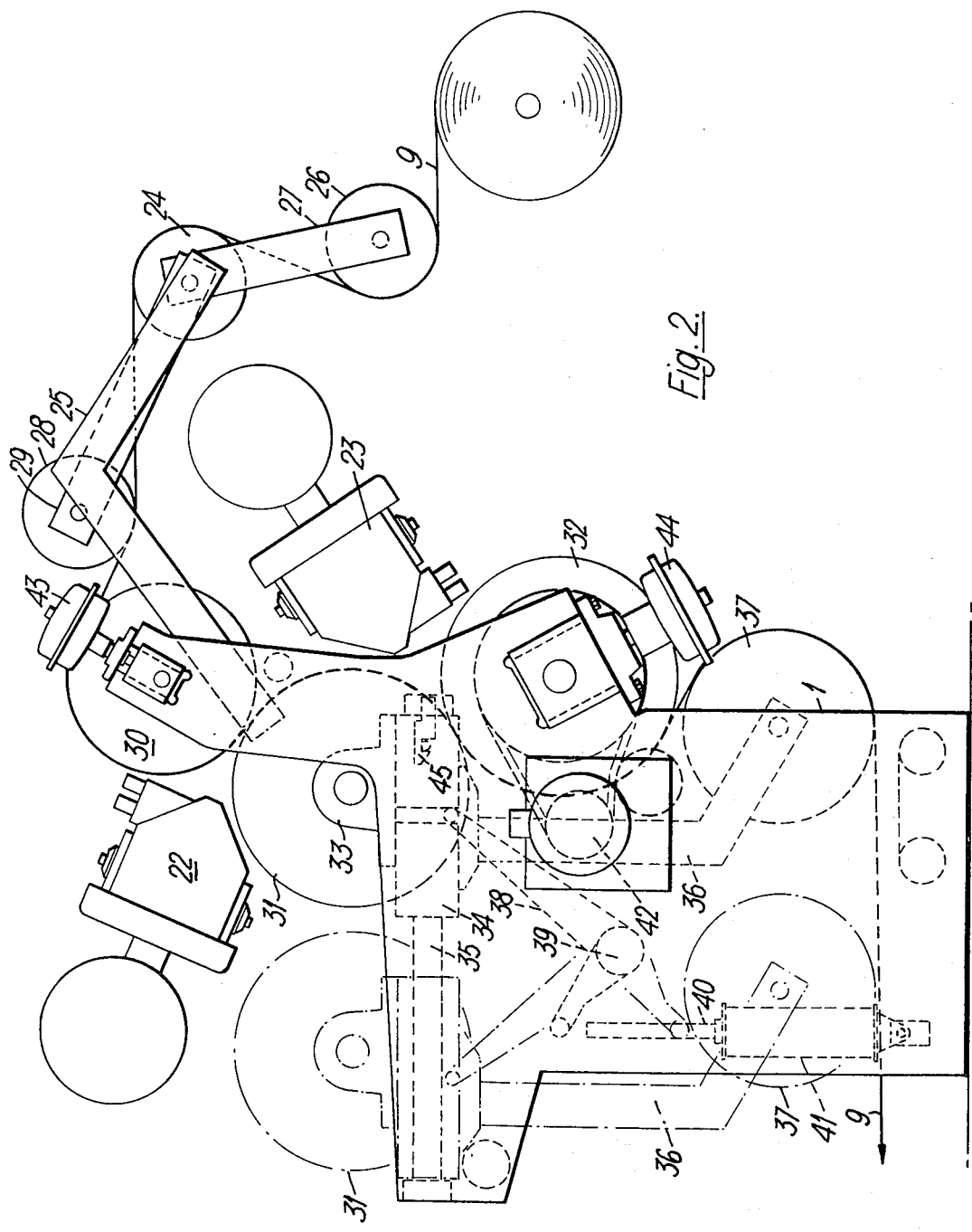

The invention will be clearly understood from the following description of forms (given, however, merely by way of example) which it may assume, and this description will be more readily followed by reference to the accompanying drawings wherein FIG. 1 represents in side elevation a web-coating machine incorporating the invention: and FIGS. 2 and 3 represent respectively side and front elevations of another form of web-coating machine in accordance with the invention.

In carrying the invention into effect in one convenient manner, as shown in FIG. 1 of the aforesaid drawings, a machine for coating both sides of a web of packaging material, (e.g., of paper, or a laminate including a layer of paper with a plastics material, e.g., polythene), comprises a frame 1 between opposite side walls of which are mounted a series of parallel cooperating rollers over and between which the web is run for treatment. These rollers may include infeed guide rollers 2, 3, a tension roller 4, three working rollers 5, 6, 7 in contact, and an outfeed roller 8. As seen from FIG. 1 the web 9 passes zig-zag between successive rollers, and since the web is comparatively wide, and readily flexible, or even limp, some difficulty is liable to arise in threading it between the rollers, (especially between the contacting working rollers 5, 6, 7).

With a view to reducing or eliminating this difficulty some at least of the rollers are mounted for separation from their neighbours or for movement to a position where they will not obstruct the operation of feeding in the leading end of a web of material. Thus the shaft 10 of roller 5 is mounted between the free ends of two levers 11 which at their other ends are pivotally attached to the frame 1. Similarly the shaft 13 of roller 6 is mounted between the free ends of levers 14 pivoted at 15 to the frame by their other ends, and the shaft 16 of roller 8 is mounted between levers 17 pivoted at 18 (which may coincide with the fixed bearings of the shaft of roller 7, which in the arrangement shown is not bodily movable). If desired the shafts of the guide rollers 2, 3 may be mounted between levers 19, at opposite ends thereof, these levers being pivoted at their mid-points 20, to brackets on an extension of the frame 1. The tension roller 4 may be mounted between fixed bearings 21 on the frame 1.

To thread the web 9 into the machine the levers 14 carrying the roller 6 are swung counterclockwise as seen in FIG. 1 to withdraw the roller 6 from the rollers 5 and 7, and the roller 5 can then be lowered by counterclockwise rotation of its supporting levers 11. Likewise the lever 17 can be swung clockwise to move the roller 8 leftwards of roller 7 as seen in FIG. 1, and it will be apparent that with the rollers 5, 6, 7, 8 in these displaced positions a free vertical path is open between roller 6 and 8 located leftwards of the path, and rollers 5 and 7 located to the right of the path, so that a free end of a web of material can be lowered between these spaced rollers. The levers 19 are rotated counterclockwise as seen in FIG. 1 to locate roller 2 above roller 3 allowing the end of a web to be passed easily between them, beneath the roller 4, and over the (lowered) roller 5 in the course of moving it to the aforesaid free vertical path between rollers 6, 8 and 5, 7. When the web has thus been inserted between the rollers, the various pivoted levers 19, 11, 14 and 17 are swung back to bring the rollers into their co-operative working positions illustrated, with the web gripped between rollers 5 and 6, and between rollers 6 and 7. Thereafter the web is advanced through the machine by either or both rollers 5 and 7 which is/are rotatably driven by connection to suitable motive means, (not shown).

In order to coat the web with plastics material in fluent condition the machine is provided with extruder devices 22, 23 of conventional form. The device 22 feeds plastics material to the face of the web exposed on the roller 5, while the device 23 feeds plastics material to the opposite face of the web exposed on the roller 6. The rollers 6 and 7, and if desired other rollers may be provided with heating and/or cooling means, as desired, to assist or control hardening and/or curing of the plastics coating. The coated web is drawn away by suitable take-off means from the roller 8 for subsequent use e.g., for packaging.

In a modified form of machine in accordance with the invention shown in FIGS. 2 and 3 one of the infeed guide rollers 24 is rotatably, but immovably, mounted between fixed extensions 25 of the frame 1, and the other guide roller 26, and the tension roller 28, mounted between the free ends of respective pairs of levers 27, 29 pivoted to swing about the axis of roller 24.

A first working roller 30 and a third working roller 32 are each rotatable in fixed bearings in the frame 1. A second working roller 31, which, in operation, is located adjacent to rollers 30 and 32, as illustrated in full line in FIG. 2, is carried on a shaft mounted between bearings 33 each supported on a slide 34 movable on a guide rail 35 in the frame. A downwardly projecting arm 36 from each slide 34 has bearings at its end, and the shaft of the off-feed roller 37 is mounted between the bearings in these arms 36. A crank lever 38 pivoted at 39 is connected by its longer limb to the slide 34, and by its shorter limb to the shaft 40 of a fluid-actuated piston in a cylindrical casing 41.

To introduce a web of material into the machine the fluid-actuated device 40, 41 are caused to swing the crank levers 38 in a counterclockwise sense, moving the slides 34 leftwards (as seen in FIG. 2) on their guide rails 35 carrying the rollers 31 and 37 to the position shown in chain-dotted lines in FIG. 2. The levers 29 and 27 are swung about their pivot to lift the guide roller 26 and tension roller 28 to raised positions. This leaves a free path for the insertion of the end of a web over the roller 24 and beneath rollers 26, 28: over the roller 30 and vertically downwards to the base of the frame 1. The piston device 40, 41 is then actuated to move the slide 34, by means of the crank lever 38, rightwards so that the rollers 31, 37 take up the hanging web, and move to working positions adjacent to the fixed rollers 30, 32. The guide and tension rollers 26, 28 are likewise swung back to their working positions as shown in FIG. 2. The roller 32 is driven by chain or belt from a motor 42 to advance the web, which as before may be provided with plastics coating material from extruders 22, 23. The shafts of rollers 30 and 32 may be mounted in movable bearings to which pressure can be applied by fluid-pressure devices 43, 44 respectively e.g. pistons actuated by air or liquid, in order to adjust and control the pressure between rollers 30, 31 and 32, 31 respectively. In order to take up the pressure applied by devices 43, 44 the slide 34 is provided with a releasable locking device 45, which engages when the roller 31 is moved to working position.

From the above description it will be seen that the invention provides a convenient arrangement of rollers in apparatus for treating a web of material, simplifying and facilitating the initial introduction of the web, but it should be understood that the invention is not limited solely to the details of the forms described above which may be modified in order to meet various conditions and requirements encountered, without departing from the scope of the invention.

What we claim is:

1. Apparatus for advancing a wide web of fragile material under tension by passing the web at substantially constant speed in serpentine manner partially around and between at least three working rollers each extending across, and being in contact with, the full width of the web, wherein two of said working rollers are located in spaced fixed positions substantially vertically, one above the other, and a third, intermediate, working roller is located, when in operation, adjacent to, and extending partially inwards between said two spaced working rollers, said third, intermediate, working roller being movable, in a substantially horizontal direction, away from its position extending partially inwards between said spaced working rollers, to an open position leaving a free vertical gap between itself and said two spaced rollers, through which the end of the web of material can be lowered under gravitational force, when being fitted into the apparatus, whereafter said intermediate roller is returnable to its working position adjacent to said two rollers in order to guide the web along a serpentine path partially around each of said three working rollers in sequence, and infeed quide rollers on the opposite side of said working rollers from said third roller when said third roller is in said open position, said infeed guide rollers training said web about the upper of said working rollers in all positions of said third roller, the web running over said infeed guide rollers in serpentine manner in passing to the first working roller, the guide rollers being relatively movable to provide a substantially unobstructed path between them for insertion of the web.

2. Apparatus as claimed in claim 1 comprising a tension roller against which the web rides before running on to the first working roller, and wherein means are provided for relative movement between the tension roller and the first working roller in order to facilitate insertion of the web between them.

3. Apparatus as claimed in claim 2 wherein the first working roller is mounted in fixed bearings, and the tension roller is mounted on movable supports.

4. Apparatus as claimed in claim 1 wherein one guide roller is mounted in fixed bearings and the other mounted on movable supports.

5. Apparatus as claimed in claim 1 comprising fluid-pressure operated motive means for moving the movable roller.

6. Apparatus as claimed in claim 1 comprising means for adjusting the working pressure between the rollers.

7. Apparatus as claimed in claim 1 comprising releasable catch means for locking the movable roller in working position.

8. Apparatus for advancing a wide web of material under tension by passing the web in serpentine manner partially around and between at least three working rollers, wherein two of said working rollers are located in spaced positions substantially vertically, one above the other, and a third, intermediate, working roller is located, when in operation, adjacent to, and extending partially inwards between, said two spaced working rollers, said third, intermediate, working roller being movable, in a substantially horizontal direction, away from its position extending partially inwards between said spaced working rollers, to an open position leaving a free vertical gap between itself and said two spaced rollers, through which the end of the web of material can be lowered under gravitational force, when being fitted into the apparatus, whereafter said intermediate roller is returnable to its working position adjacent to said two rollers in order to guide the web along a serpentine path partially around each of said three working rollers in sequence, the movable roller being mounted on a slidable support for movement away from the working position, and an outfeed roller over which the web runs after leaving the last of said three working rollers, the outfeed roller being mounted on the slidable support of the movable working roller for movement between its working position and a displaced position where it will not obstruct feeding of the web between the spaced working rollers.

* * * * *